(No Model.) 3 Sheets—Sheet 1.
A. W. GRANT.
WHEEL RIVETING MACHINE.
No. 345,133. Patented July 6, 1886.
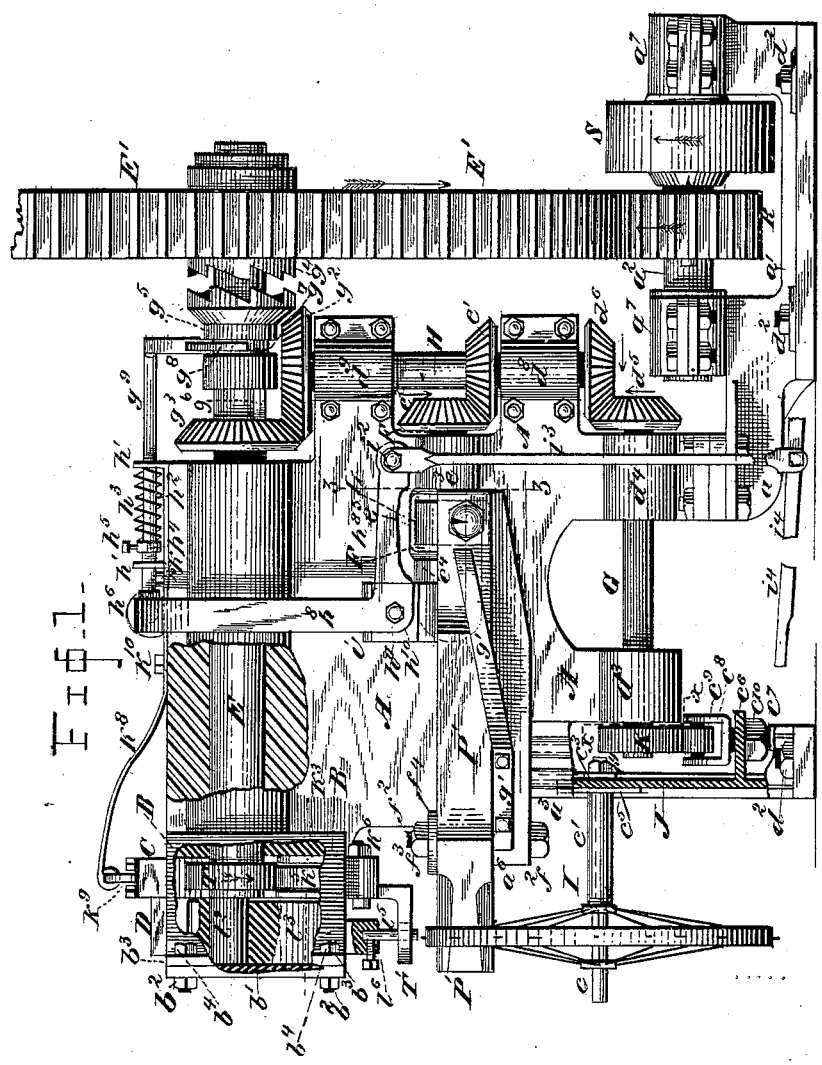
WITNESSES
INVENTOR
Arthur W. Grant,
By Toulmin & Gemmer,
his Attorneys.

(No Model.) 3 Sheets—Sheet 2.
A. W. GRANT.
WHEEL RIVETING MACHINE.
No. 345,133. Patented July 6, 1886.
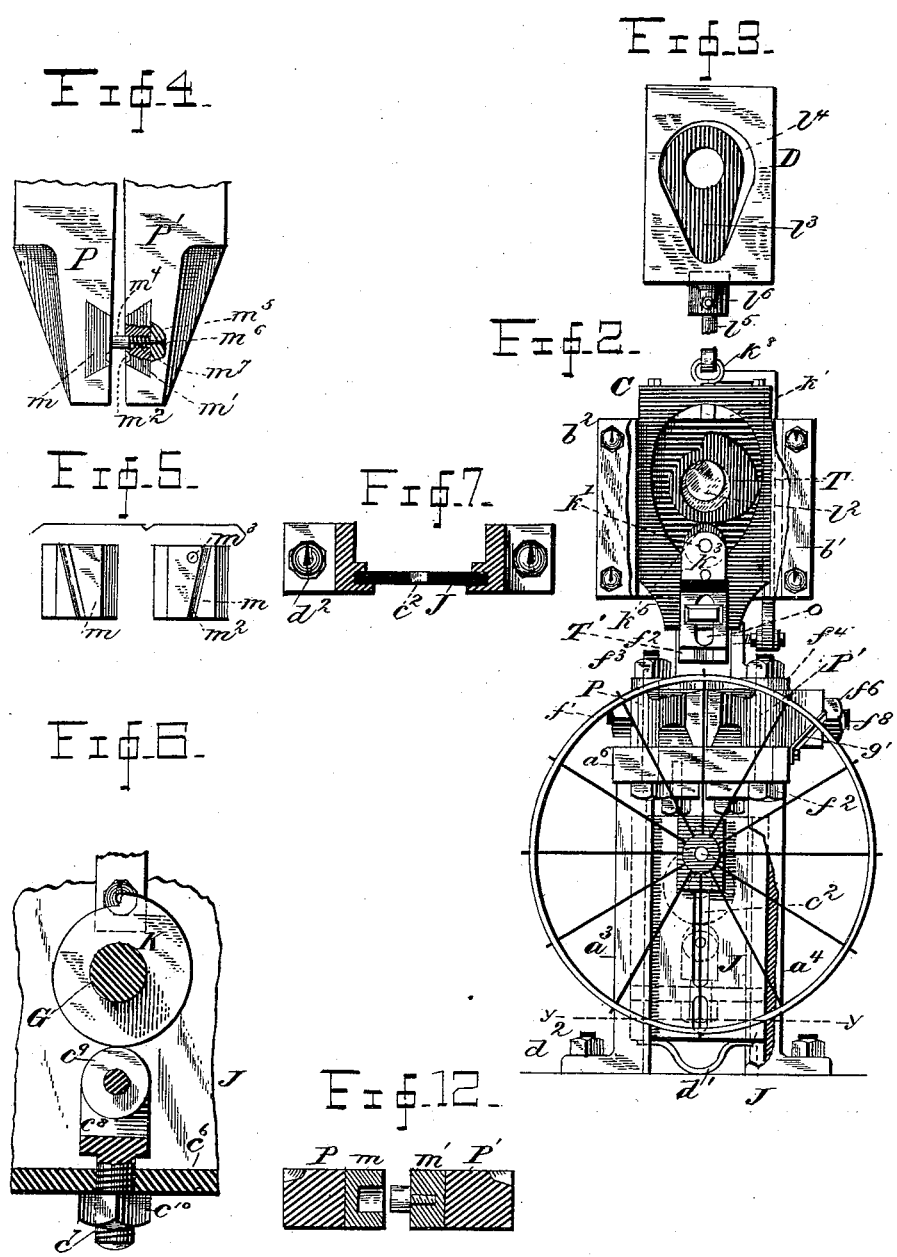
WITNESSES
INVENTOR
Arthur W. Grant,
By Toulmin & Jemmes,
his Attorneys.

(No Model.) 3 Sheets—Sheet 3.
A. W. GRANT.
WHEEL RIVETING MACHINE.
No. 345,133. Patented July 6, 1886.
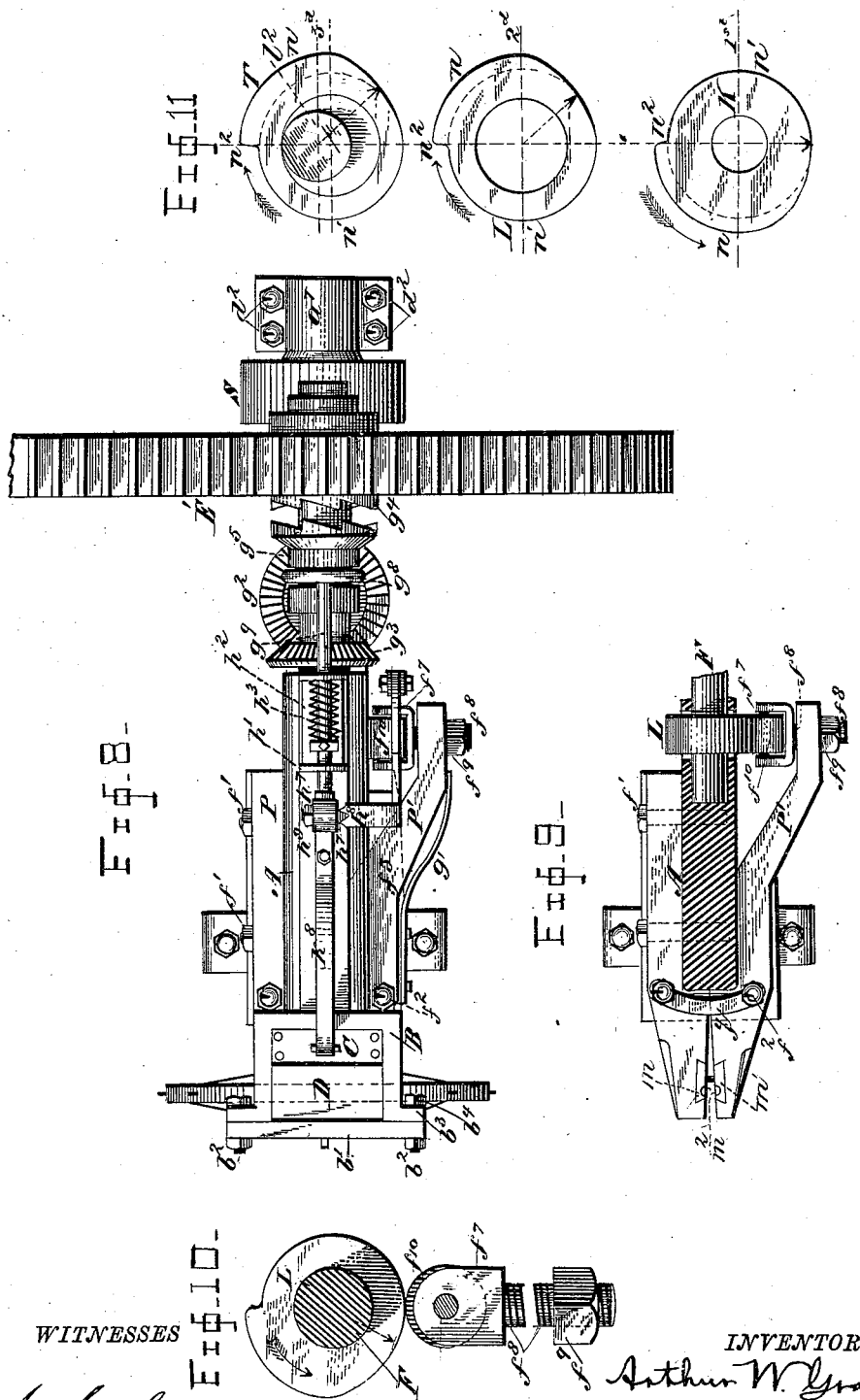
WITNESSES
INVENTOR
Arthur W. Grant,
By Toulmin & Jemmes
his Attorneys.

UNITED STATES PATENT OFFICE.

ARTHUR W. GRANT, OF SPRINGFIELD, OHIO, ASSIGNOR TO THE TRICYCLE MANUFACTURING COMPANY, OF SAME PLACE.

WHEEL-RIVETING MACHINE.

SPECIFICATION forming part of Letters Patent No. 345,133, dated July 6, 1886.

Application filed February 1, 1886. Serial No. 190,511. (No model.)

*To all whom it may concern:*

Be it known that I, ARTHUR W. GRANT, a citizen of the United States, residing at Springfield, in the county of Clark and State of Ohio, have invented certain new and useful Improvements in Machines for Riveting Wheels, of which the following is a specification, reference being had therein to the accompanying drawings.

This invention relates to machines for riveting spokes to the tires or fellies of wheels—such as tricycle, bicycle, and other wheels—having metallic spokes.

In the manufacture of wheels—such as bicycle or metallic wheels—as heretofore practiced it has been customary to rivet the spokes to the tire by riveting-tools operated by hand, and great difficulty has been experienced in riveting the wheel uniformly or in upsetting the same amount of metal of each spoke which protruded through the tire, it requiring the employment of skilled workmen to operate the tool to secure anything like good work, and even then the majority of wheels after being riveted would be considerably out of true, some spokes being upset more than others, and the tire in consequence being pressed at some places nearer the axis of the wheel than at others, thus forming a wheel the tire of which is not concentric to its axis, and to obviate this objection it necessarily required a subsequent operation to true the wheel, which operation also required the employment of more or less skilled workmen. Therefore the operation of riveting the spokes to the tires of wheels as heretofore practiced required the employment of skilled labor, and consumed much time in making the wheels, thereby completing a comparatively few wheels at a considerable cost.

In thus referring to the manufacture of wheels, it is not desired to depreciate the art as heretofore practiced, or to depreciate the worth of any inventions which may exist to carry out the art; but it is simply alluded to in comparison as illustrative of the improvement in the art or method of riveting the spokes to wheels as carried out in the machine which constitutes the subject-matter of the present invention, as over the method and apparatus heretofore used.

The purpose and chief object of my invention is primarily to provide a machine operating automatically to receive and hold a wheel, press the ends of the spokes which are projected through the tire over upon said tire uniformly to form a head, thus riveting the spokes to the tire, and at the same time align the tire with relation to its axis of revolution by so regulating the amount of metal of the spokes upset upon the tire as to make their heads equidistant from the axis of the wheel, to thereby gradually true the wheel during the operation of riveting, and with great rapidity, thus obviating the necessity of any subsequent operation to true the wheel.

The invention, briefly stated, consists in the combination, in a machine for riveting the spokes to the tires or fellies of wheels, of a wheel-supporting spindle adjustably connected to the frame of the machine in a suitable manner; a pair of jaws or grippers to grasp and hold the spokes of the wheel while being riveted to the tire or felly, and to support the tire; a reciprocating punch to act upon and upset the end of the spoke projected through the tire to form a head and rivet the spoke to the tire; cams, gearing, and other mechanism to actuate the said parts and automatically regulate their movements relatively to one another, all arranged and constructed substantially as hereinafter fully described.

It also consists in the certain combination of parts, their special constructions, and in a certain mechanism for supporting, actuating, and adjusting the said parts, as will be hereinafter described and claimed.

Figure 1, Sheet 1, represents in side elevation a wheel-riveting machine constructed in accordance with this invention, portions of the machine being broken away and shown in section, to more clearly show the parts, the said figure showing a wheel in place upon the machine and in position to be operated upon, the parts of the machine being in their normal position—that is to say, the wheel-holding spindle, presser-foot, and punch are in an elevated position, or in the position they are in preparatory to operating upon the wheel; Fig. 2, Sheet 2, a front elevation of the machine and wheel in a like position, parts being broken away, and the punch, its guiding-head, and rocking arm being removed from the head of the machine, so as to clearly show the presser-foot, its guiding-head, cam, &c., the main gear, which is mounted upon the shaft that actuates the presser-foot and punch not being shown; Fig. 3, a front view of the punch, punch spindle or stock, its guiding-head and rocker-arm; Fig. 4, a plan view of a portion of a spoke-grasping jaw partially in section, showing the grooved spoke-holding dies and the gaging-pin, which determines the position of the spoke to be operated upon with relation to the punch; Fig. 5, a detail face views of the two spoke-holding dies; Fig. 6, an enlarged rear view, partially in section, of a portion of the reciprocating cross head which supports the wheel-holding spindle, it showing the cam and mechanism which control the movements of the cross-head, the cam shaft being shown in section on the dotted line $x\ x$, Fig. 1, Sheet 1; Fig. 7, a horizontal cross-section of the supporting-frame of the machine on dotted line $y\ y$, Fig. 2, Sheet 2, looking downward; Fig. 8, Sheet 3, a plan view of the machine, portions being broken away; Fig. 9, a detail plan view of the spoke-grasping jaws, showing the cam and mechanism which controls their relative movements, the cam-shaft being broken off; Fig. 10, an enlarged detail rear view of the cam mechanism that operates the jaws, the cam-shaft being broken off and shown in section on line $z\ z$, Fig. 1, Sheet 1; Fig. 11, details of the cam and eccentric that operates the punch and presser-foot, of the cam that operates the jaws, and the cam that actuates the cross-head and wheel-supporting spindle, the said figure showing the relative positions of the cams in one position of the machine; and Fig. 12 is a vertical cross-section of the spoke-grasping dies of the jaws P P′, showing a modified form of spoke-grasping pin and the manner of securing it to the dies.

Referring to the drawings, A represents the frame of the machine, which is supported at its rear end by the forwardly-projecting arm $a$ of the pillow-block $a'$, which supports the main driving-shaft $a^2$ of the machine, and at its forward end by two upright standards, $a^3$ $a^4$, bolted to the frame A by bolts $a^5$, extending through the table $a^6$, forming a part of and extending horizontally a short distance each side of the main footing of the frame A, as shown in Figs. 1 and 2, the table $a^6$ acting as a support for the spoke-grasping jaws, as will be hereinafter fully explained.

The frame A will be preferably constructed of cast metal, the upper portion being of a construction in a manner similar to the construction of a sewing-machine, with the exception that instead of an open arm the frame will be solid, the said frame having a forwardly-projecting head, B, open in front, as in a sewing-machine head, and is provided with a face-plate, $b'$, which is secured to the head by bolts $b^2$, extending through the face-plate and through the outwardly-projecting flanges $b^3$ of the head, nuts $b^4$ upon the bolts $b^2$ securing the heads and face-plate together. As shown in Figs. 2 and 8, the head B of the machine is open at its top and bottom, the opening in the head being of sufficient area to receive and guide the presser-foot guiding-head C and the punch-head D, the said presser-foot and punch-heads being preferably oblong, and having central openings of sufficient area to permit movement of their operating-cams, as will be be hereinafter set forth.

I do not desire to limit myself to any special construction of the frame A of the machine, as it may be of various constructions, it simply being necessary to provide the same with a head, B, a table to support the spoke-grasping jaws, as before described, and form journal-bearings to support three horizontal and one vertical shaft—i. e., the shaft E, which supports the spur-wheel E′, and operates the presser-foot head C and punch-head D; the short shaft F, that operates the spoke-grasping jaws; the shaft G, that operates the cross-head that supports the wheel-holding spindle, and the vertical shaft H, through which motion is transmitted from the shaft E to the shafts F and G, the shaft $a^2$, which drives the shaft E, not forming a part of the frame-work of the machine.

All the shafts of the machine, pinions, and gearing are so arranged relatively to one another and with relation to the machine that a vertical longitudinal section taken through the center of the machine would bisect the said parts, their axes being central relatively to each other.

Below the table $a^6$, and extending outward in a line central to the machine in a horizontal plane, is a wheel-supporting spindle, I, the said spindle being of a diameter at its forward end, as at $c$, slightly less than the internal diameter of the axle-box of the wheel to be supported by the spindle and to be operated upon, and at its rear end of greater diameter than said box, to act as a shoulder, against which the hub may abut, as shown at $c'$, the said spindle being turned down and screw-threaded at its extreme rear end, which threaded end is extended through an elongated slot, $c^2$, in the cross-head J, which cross-head is supported and slides in horizontal guiding-grooves in the two upright supporting-standards $a^3$ $a^4$, the spindle I being adjustably secured to the cross-head J by the nut $c^4$, washers $c^5$ $c^3$ being interposed between the enlarged portion $c'$ of the spindle and cross-head and between the cross-head and nut $c^4$, to form a better bearing and prevent the possibility of the spindle being pushed or drawn through the slot $c^2$ in the cross-head. The cross-head J will preferably be made of cast-iron and about one inch thick, it having near its lower end a horizontal rearwardly-projecting flange or lip, $c^6$, with a vertical screw-threaded hole therein, the said hole being entered by the screw-threaded shank $c^7$ of a bracket, $c^8$, which bracket supports at its upper end a friction-roller, $c^9$, and is adjustably secured to the flange $c^6$ by the nut $c^{10}$, and being adapted to be raised or lowered, as desired. The friction-roller $c^9$ is pressed constantly into contact with a cam, K, (shown clearly in Fig. 6, Sheet 2,) by a spring, $d'$, bearing against the under side of the cross-head J, the said cam K being keyed or otherwise secured to the horizontal shaft G, and being of such shape as to impart, through the medium of the friction-roller $c^9$, a reciprocating or upward and downward movement to the cross-head J and supporting-spindle I, said spindle, as before stated, being adjustably secured to the cross-head, and being adapted to be raised or lowered with relation thereto and with relation to the punch, to adapt the machine to wheels of greater or lesser diameter.

The machine will preferably have a foundation-plate or bed-plate, to which the standards $a^3$ $a^4$ and the pillow-block $a'$, which supports the machine proper, will be bolted by means of the bolts and nuts $d^2$.

The shaft G, to the forward end of which is keyed the cross-head-operating-cam K, has its bearings in the frame-work of the machine, as shown at $d^3$ $d^4$, the said frame-work being preferably cut away between the journals of the shaft, so as to support the shaft at either end, and not have unnecessary friction-surface. Strictly speaking, the supports for the shaft are not journal-boxes; but, if desired, they might be halved and provided with adjustable journal-box caps, and of a construction similar to the journal-boxes $a^7$ of the pillow-block $a'$, which supports the driving-shaft $a^2$, this being a mere mechanical change in the machine to be determined by practical requirements.

Keyed to the extreme rear end of the shaft G is a vertically-rotating bevel gear-wheel, $d^5$, the teeth of which mesh with and are driven by a corresponding horizontally-rotating bevel gear-wheel, $d^6$, keyed to the extreme lower end of the vertical shaft H, having its bearings in the two journal-boxes $d^8$ $d^9$, formed partially integral with and extending out a short distance beyond the main portion of the frame-work A, the journal-box $d^8$ being close to the bevel gear-wheel $d^6$, and the one, $d^9$, being sufficiently far above the one, $d^8$, to permit the reception and operation of a vertically and a horizontally rotating bevel gear-wheel, as set forth farther on.

Approximately close to the journal-box $d^8$, and between it and the journal-box $d^9$, is a horizontally-rotating bevel gear-wheel, $e'$, which is keyed to the vertical shaft H, the teeth of the wheel $e'$ meshing with the teeth of and driving the vertically-rotating bevel gear-wheel $e^2$, keyed to the extreme rear end of the short horizontal shaft F, which has its bearings in the frame A of the machine at $e^3$ $e^4$, a portion of the frame being cut away, as at $e^5$, between the ends of the shaft F and near its center, to permit the movement of the cam L, which is keyed or otherwise secured to the shaft F. This shaft F is located and mounted in the frame a short distance above the table $a^6$, which supports the spoke-grasping jaws P P', which extend a distance outwardly to act as an arm to support the tire or felly of the wheel held upon the spindle I, adjustably secured to the cross-head.

The spoke-grasping jaws will preferably be secured to the table and to each other, as shown in the drawings, (shown more clearly in Fig. 9, Sheet 3)—that is to say, the one, P, will be bolted rigidly to the frame A by the bolts $f'$, and will extend from a point in advance of the frame on one side back to a point nearly flush with the front face of the opening $e^5$, the said jaw extending around the front edge of the frame, its spoke-grasping face being substantially on a line with the center of machine and in the same plane; and the jaw P' is pivoted near its forward end to the table $a^6$ by the bolt $f^2$, extending through the table and jaw, a nut, $f^3$, holding it in place, a metallic strap, $f^4$, extending from the jaw P to the jaw P', to which it is secured by the bolts $f^2$, which extend through the jaws and table. It is obvious that both jaws, P and P', could be pivoted, if desired. The jaw P' will be bowed outward (or cast in this shape) at its rear end, as shown at $f^5$, and will extend to a point near the rear face of the opening $e^5$ in the frame, the longitudinal horizontal center of the said jaw P' being substantially in a line with the axis of the shaft F and its cam L. This jaw P' is provided at its rear end, in a line with the cam L, with a bracket, $f^7$, having a screw-threaded shank, $f^8$, which enters a transverse hole in the jaw P', it being adjustably secured to the jaw by an adjusting-nut, $f^9$, the said bracket supporting at its opposite end a revolving anti-friction roller, $f^{10}$, which is constantly held in contact with the cam L by means of a flat steel spring, $g'$, bolted to the frame or table of the machine at one end and bearing upon the jaw P' at its opposite or rear end. This spring $g'$ will be made in practice sufficiently stiff to keep the roller $f^{10}$, removably and adjustably secured to the end of the jaw P', constantly pressed against the cam L, which, through the medium of the roller $f^{10}$, controls the movement of the jaw P' with relation to its fellow jaw, P, the said cam during its rotation operating to press the rear end of the jaw P' outward and its forward end inward, to thus grasp the spoke, the bolt $f^2$ acting as the axis upon which the jaw rocks. If desired, the jaw, P' might have a radial slot formed through it at its axis and in a line with the radius of its movements, through which the bolt $f^2$ might extend to permit the jaw P' to be adjusted more or less at its forward end with relation to the jaw P, the strap $f^4$ in such case being also constructed so as to be adjustable. As will be noticed, however, by reference to the drawings, and as will be hereinafter explained, all the parts, or most of them, are so arranged and constructed that they may be readily adjusted relatively to one another to compensate for wear, and to change their relative movements. This may be done in many ways different from those herein shown and described, it simply requiring ordinary mechanical skill to change the relative arrangement of the parts and their special constructions to accomplish this end. Therefore I do not desire to limit myself to the special constructions and arrangements herein shown and described, the changes being so innumerable and apparent to those skilled in the art that I will not enter into details or attempt to describe any that are not shown in the drawings.

At the upper end of the vertical shaft H, and keyed thereto just above the upper face of the journal-box $d^9$, is a horizontally-rotating bevel gear-wheel, $g^2$, driven by and meshing with a vertically-rotating bevel gear-wheel, $g^3$, secured to the main horizontal shaft E, which extends through the frame A, longitudinally near its upper end nearly its entire length, the said shaft at its rear end having loosely mounted thereon the main spur-wheel E', which meshes with and is driven by the pinion or cog-wheel R, keyed to the driving-shaft $a^2$, the said shaft $a^2$ being provided with a driving-pulley, S, motion being imparted to it through the medium of a belt extending over a pulley on the main or counter-shaft in the factory. The forward face of the hub of the loose spur-wheel E' has a series of ratchet-teeth formed therein to form a clutch-half, $g^4$, to be engaged by the ratchet-teeth of the clutch-half $g^5$, movably secured to the shaft E, between the bevel gear-wheel $g^3$ and a spur-wheel, E', by a spline, $g^6$, fast to the shaft and entering a groove in the bearing-face of the clutch-half $g^5$, the said clutch-half having an annular groove, $g^7$, formed in its periphery, which is engaged by the arms $g^8$ (one on each side of the clutch-half) of the shifting-rod $g^9$, which extends forward above the frame of the machine and has bearings in the upwardly-projecting arms $h'$ of a bracket, $h^2$, bolted to the upper face of the frame A, the arms of the bracket being sufficiently separated to permit the reception of a spiral spring, $h^3$, which encircles the shifting-rod $g^9$, bearing against the one arm $h'$ of the bracket at its rear end and against the rear face of an adjusting sleeve or collar, $h^4$, at its forward end, the said collar $h^4$ being movably secured to the shifting-rod $g^9$ by a set-screw or bolt, $h^5$, whereby the tension of the spring $h^3$ may be regulated, the object and purpose of the spring $h^3$ being to keep the clutch-halves $g^4$ and $g^5$ normally separated. The forward end of the shifting-bar $g^9$, which is projected through the forward arm $h'$ of the bracket $h^2$, is provided with an eye, $h^6$, through which a screw-threaded pin, $h^7$, of a bell-crank, $h^8$, is extended and is secured by a nut, $h^9$, the said bell-crank being pivoted at or near its bend $h^{10}$, by means of the bolt $h^{11}$, to the sleeve or angle-plate $i'$, secured to the table $a^6$ of the frame. (This shoe might, if desired, be dispensed with, and the bell-crank might be pivoted to the frame of the machine.)

This bell-crank is engaged at its rear end, $i^2$, by an operating-rod, $i^3$, pivoted thereto at its upper end, as shown in Fig. 1, Sheet 1, and Fig. 8, Sheet 3, the said operating-rod preferably extending below the bed-plate of the machine and being engaged by a foot-lever, $i^4$, which will be pivoted thereto near its rear end, it being pivoted at its extreme rear end to proper blocks and extended out sufficiently far in front of machine to be conveniently operated by the person operating the machine. This arrangement of shifting mechanism, as will be noticed by the drawings, enables the operator to throw the clutch-half $g^5$ into engagement with the clutch-half $g^4$ of the spur-wheel, which will start the parts in motion, and by releasing the foot-lever the clutch-halves will be instantly separated from one another by the action of the spiral spring $h^3$, encircling the shifting-rod $g^9$.

The mechanism for throwing the clutches into and out of gear might be constructed in various ways. Therefore it is not desirable to limit myself to the special construction herein shown and described.

I will now proceed to describe the construction and arrangement of parts that directly and indirectly actuate the presser-foot and punch of the machine, and control their relative movements, the punch and presser-foot being two very essential features of this machine. Keyed to the shaft E just inside the opening of the machine-head B is a cam, T, (shown clearly in Fig. 2, Sheet 2,) the said cam operating in the opening $k'$ in the presser-foot head C, the said head being guided in its movements by the walls forming the head B of the machine, the opening $k'$ being of sufficient area to permit the rotation of the cam. The presser-foot T' is adjustably secured to the lower end of the presser-foot head C by a bolt, $k^6$, extending through an elongated slot, $o$, in the upper end of the presser-foot and into the presser-foot head, said presser-foot extending upward and being seated in a groove in the front face of the presser-foot head. The presser-foot head is also provided, at the lower face of the opening $k'$, with two upwardly-projecting arms, $k^3$, there being one at either face of the head, the two arms being seated, one in the groove $k^2$ in the front face of the presser-foot head and one in a similar groove in the rear face of the presser-foot head, they being adjustably secured in place by bolts $k^4$. The arms $k^3$ are provided at their upper ends with an anti-friction roller, $k^5$, located between them, which roller revolves on a pin or shaft, $k^7$, seated in the openings in the two arms, and bears against the cam T, the said roller being pressed constantly against the cam by means of the spring $k^8$, which encircles an eye, $k^9$, secured to the upper end of the presser-foot head C, the said spring being bowed upward and then downward, it being secured at its rear end to the upper face of the frame A by bolts, $k^{10}$, the resistance of said spring tending constantly to raise the presser-foot head C and keep its friction-roller constantly contacted with the cam T. The presser-foot T' will be in construction very similar to the construction of the presser-foot in a sewing-machine, it having an elongated central opening, $l'$, in its foot portion, through which the punch of the machine may work. The forward end of the shaft for a distance equal to the distance between the forward face of the presser-foot head C and face-plate $b'$ of the head B of the machine will be preferably turned down, as shown at $l^2$, to form an eccentric, the periphery of said eccentric being at one point preferably flush with the periphery of the main portion of the shaft E. Upon the eccentric $l^2$ is loosely mounted a rocking arm, $l^3$, which arm is somewhat V-shaped, with a rounded lower end, and which rocks backward and forward in a direction transverse to the length of the machine in an opening, $l^4$, in the punch-head D during the rotation of the shaft E, and reciprocates the punch $l^5$ upward and downward, to press the head upon the spoke of the wheel being operated upon, the said punch being adjustably secured in a spindle, $l^6$, which in turn is secured in an opening in the lower end of the punch-head.

It will be noticed by reference to the drawings (see Fig. 3, Sheet 2) that the opening $l^4$ in the punch-head is somewhat similar in shape to the shape of the rocking arm, the lower end of the rocking arm being rounded and operating in the lower end of the face of the opening $l'$ centrally, to press the head D downward as the eccentric revolves, and the upper end of the arm $l^3$ operates against the upper face of the opening to raise the punch-head and punch.

There are various ways of constructing the mechanism which controls the movement of the punch. Therefore I do not desire to limit myself to the exact construction shown in the drawings and described herein.

Seated in the dovetailed grooves, near the forward end of the jaws P P' and flush with their spoke-grasping faces, are two steel dies, $m\ m'$, the one, $m$, being seated in the groove in the jaw P, and the one, $m'$, in the jaw P', each die having a semicircular groove, $m^2$, longitudinally in its operating-face, said grooves being inclined with relation to the vertical plane of the dies and of an inclination equal to the inclination of the spoke of the wheel to be operated upon, as are the spokes in bicycle-wheels. When in position in the jaws, the grooves $m^2$ are directly opposite each other, and grasp around the spoke to be operated upon, the said grooves being preferably roughened at their faces, as shown in Fig. 5, to more firmly grasp the spoke. One of the dies (preferably the one, $m'$, seated in the jaw P') has a transverse hole, $m^3$, formed therein very close to the rear edge of the spoke-grasping groove $m^2$, the said opening being provided with a gaging-pin, $m^4$, the head of which is approximately the diameter of the opening $m^3$, the said pin having a stem, $m^5$, of lesser diameter than the head, which extends through the opening and enters a smaller opening, $m^6$, formed in the jaws P', central with relation to the opening $m^3$ of the die, a spiral spring, $m^7$, being interposed between the head of the gaging-pin and the shoulder formed by the smaller opening in the jaw P', said spring encircling the pin-stem and tending to keep the head of the pin pressed constantly against the face of the jaw P as the jaws are opened and closed, the object of the pin being to act as a gage or stop when inserting a spoke of the wheel between the jaws, and to center it in the grooves in the dies and with relation to the punch. As the spokes of the wheel are pushed between the jaws and operated upon in rapid rotation, it is very essential to provide the jaws with a stop or gaging-pin, to stop the spoke as it is pushed between the jaws, and position the spoke with relation to the spoke-grasping grooves $m^2$ of the dies $m\ m'$, and center the spoke with relation to the punch, and therefore I have provided the jaws with a spring-held pin to accomplish this result; but inasmuch as there are various ways of constructing a pin and of attaching it to the jaws I do not desire to limit myself to the exact construction herein shown in Fig. 4. For instance, the gaging-pin might be a solid cylindrical piece of metal screw-threaded at one end, and screwed into one of the jaws or dies with its end projecting into a hole in the opposite jaw or die, the hole being of sufficient depth to receive the entire length of the projecting end of the pin as the jaws are closed, this being a simple way of providing the jaws with a gage-pin, and is illustrated in Fig. 12, the said figure showing in vertical cross-section a pair of dies, one provided with a fixed pin and the other with an elongated receiving-opening.

The operation of my improved wheel-riveting machine is as follows: The parts of the machine being in their normal position or elevated, a wheel to be operated upon (it having its spokes slightly projected through the tire) is first placed or slid upon the small end $c$ of the wheel-supporting spindle, which will slide one of the spokes of the wheel between the jaws, it striking against the gaging-pin, and thereby centered with relation to the spoke-grasping grooves in the dies of the jaws and with relation to the punch to operate upon it. The foot-lever $i^4$ is then pressed downward, which, through the medium of the operating-rod $i^3$, bell-crank $h^8$, shifting-rod $g^9$, and its clutch-grasping arms $g^8$, will throw the longitudinally-movable clutch-half $g^5$ into engagement with the clutch-half $g^4$, fixed to the loose spur-wheel E', which meshes with and is rotated by the pinion $a^2$ on the driving-shaft, which in turn is rotated by the belt-pulley S, which will impart motion to the presser-foot and punch-operating shaft E, and, through the medium of the vertical shaft and its bevel-gear, will impart motion to the spoke-grasping jaws-operating shaft F, and wheel-holding pin-operating shaft G.

The cam and eccentric are so constructed and arranged upon their respective shafts, as shown in the diagram, Fig. 11, Sheet 3, as to operate the parts in the following manner and in the rotation as hereinafter set forth. The diagram, Fig. 11, shows the cams in position relative to one another in the normal position of the parts or just preparatory to beginning operation, the wheel being shown in the drawings with its tire slightly above the spoke-grasping jaws, which it encircles, the holding-spindle being elevated to permit the said wheel to be easily slid over the jaws without contacting therewith, the jaws acting, as heretofore described, as a support for the tire while the spoke is being riveted thereto. The shafts which operate the parts of the machine are all started in operation simultaneously; but the cams upon the said shafts, which operate directly the parts and control their movements, are so constructed and arranged upon the shafts as to operate the parts in the following order: First, the cross-head, which is provided with the wheel-supporting spindle, is lowered by the cam K, which will lower the wheel the desired distance until its tire or felly rests upon the upper face of the jaws P P', the jaws being open, and the spoke of the wheel being between them and in the proper position to be operated upon; second, the spoke-grasping jaws start to close upon and to grasp the spoke through the medium of its cam and anti-friction roller, and at the same time the presser-foot and punch start to descend, the punch slightly preceding the downward movement of the presser-foot, the presser-foot being forced downward by the cam T acting against the anti-friction roller adjustably secured to the presser-foot guiding-head, and the punch being forced downward by the rocking arm $l^3$ upon the eccentric end $l^2$ of the shaft E, the presser-foot acting to press the tire closely to the upper face of the jaws P P', to securely hold it in position, and the punch acting to upset the metal at the head of the spoke over upon the tire, to rivet the spoke and tire together, after which the parts automatically return to their normal position, the anti-friction rollers being pressed by the springs which keep them in contact with the cams, being pressed from the greater radius $n$ of the cam into the smaller radius $n'$, when their shoulders $n^2$ pass the center of the friction-rollers.

By my machine I am enabled to rivet metallic-spoked wheels with greater rapidity, and dispense with the services of skilled workmen heretofore required to rivet wheels, which greatly cheapens the cost of production.

In the manufacture of wheels with metallic spokes it is found desirable to stretch the spokes straight and taut; but this must be done equally with every spoke, so as not to place the hub eccentrically to the rim. In the machine I have constructed I so actuate the jaws and the cross-head that the spokes on being grasped will immediately be stretched or drawn taut by the closely-following descent of the cross-head and its attached spindle, upon which the wheel is mounted.

Having thus fully described my invention, what I claim as new, and desire to secure by Letters Patent, is—

1. In a machine for riveting the spokes to the tires or fellies of wheels, the combination, with the frame-work A, of the two supporting standards $a^3$ $a^4$, having the vertical guiding-grooves $c^3$ therein, a cross-head sliding in said grooves and provided with a spindle adjustably connected therewith and extending out at right angles thereto, said pin being adapted to support a wheel to be operated upon, a cam and cam-shaft to automatically impart a reciprocating movement to the cross-head and wheel-supporting spindle, jaws to grasp the spoke of the wheel, one of which is pivoted to the frame or table, a cam and cam-shaft to actuate said jaws and regulate their relative movements, said jaws at their forward ends acting as a support for the tire or felly, a presser-foot to bear upon the tire or felly, a cam to reciprocate said presser-foot, a punch to act upon the head of the spoke to rivet it to the tire or felly, and mechanism to automatically reciprocate said punch and regulate its movements, substantially as described.

2. In a wheel-riveting machine, a wheel-supporting spindle secured to a cross-head sliding in grooves in the frame-work or supporting-standards of the machine, in combination with a cam and cam-shaft, to automatically reciprocate the said cross-head to raise or lower the wheel supported upon the spindle, substantially as described.

3. The combination, in a wheel-riveting machine, of the cross-head J, sliding in grooves in the standards $a^3$ $a^4$ or frame of the machine, the wheel-holding spindle I, adjustably secured to the cross-head and extending out at right angles thereto, as shown, the friction-roller $c^5$, mounted in a suitable bracket adjustably secured to the cross-head, the cam K, mounted upon the horizontal shaft G, with which the friction-roller is pressed into contact by the spring $d'$, acting against the lower end of the cross-head, and mechanism to drive the cam K, which in turn lowers the cross-head and wheel-holding spindle with relation to the punch which is to act upon the spoke of the wheel, the spring tending to keep the cross-head elevated and its anti-friction roller in contact with the operating-cam, all substantially as shown and described.

4. In a wheel-riveting machine, the wheel-supporting spindle I, turned down at its forward end to form a shoulder, against which the hub of the wheel may abut, in combination with the reciprocating cross-head J, having the elongated slot $c^2$ therein, in which slot the spindle I is adjustably held, the spring $d'$, bearing against the lower end of the cross-head, and mechanism, substantially as described, to operate the cross-head and regulate its movements.

5. The combination, in a wheel-riveting machine, with the frame-work A, of the horizontal shafts E F G, each of which shafts is provided with a cam and a gear-wheel to operate the cross-head which supports the wheel-holding spindle, to raise it or lower it with relation to the punch, to operate the spoke-grasping-jaws, and to operate the punch, respectively, and a vertical shaft, H, to transmit motion from one to the other shaft, substantially as described, and mechanism to impart motion to the main shaft E, all as set forth.

6. In a wheel-riveting machine, a pair of spoke-grasping jaws, one of said jaws being pivoted to the table or frame of the machine near its forward end and the other fixed to the frame of the machine, one of said jaws being provided at its rear end with an adjustable bracket having an anti-friction roller secured therein, in combination with a cam mounted upon a cam-shaft driven by suitable mechanism to move one jaw with relation to the other, to grasp the spoke of the wheel to be operated upon, substantially as described.

7. In a wheel-riveting machine, the combination, with the pivoted jaw P' and jaw P, of the dies $m\ m'$, one to each jaw, let into a groove in the jaw flush with the operating-faces, the said dies having longitudinal spoke-grasping grooves therein, substantially as described.

8. In a wheel-riveting machine, the combination, with two spoke-grasping jaws, of a gaging-pin movably held in one jaw, or its spoke-grasping die, for the purpose of stopping the spokes as it is pushed between the jaws and act as a gage to center the spoke with relation to the punch which subsequently operates upon it, all as and for the purpose described.

9. In a wheel-riveting machine, the combination, with the jaws P P', of the dies $m\ m'$, grooved longitudinally, as described, and having the transverse hole $m^3$ formed therein, and the guiding-pin $m^4$, having the enlarged head, and a small stem, $m^5$, held in said opening $m^3$, the stem of the pin being projected into a small hole in the jaw P', and being provided with a spiral spring interposed between the head and shoulder formed by the small opening in the jaw, to press the head of the pin constantly against the face of the opposite die and permit it to extend back into the opening $m^3$ as the jaws are closed, substantially as and for the purpose described.

10. In a wheel-riveting machine, the combination, with the jaws P P', having vertical dovetailed grooves in their adjacent faces, of the dovetailed dies $m\ m'$, seated in said grooves flush with the faces of the jaws, and having the roughened or corrugated faced inclined spoke-grasping grooves $m^2$ formed therein, substantially as described.

11. In a wheel-riveting machine provided with spoke-grasping jaws, one of which is pivoted to the frame of the machine, the combination, with one of said jaws, of the bracket $f^7$, having the screw-threaded shank $f^8$, screwed into a transverse hole in the rear end of the jaw, and provided with an adjusting-nut, $f^9$, a friction-roller pivoted to said bracket and adapted to bear against a cam, L, secured to a horizontal cam-shaft having a gear-wheel secured to its end to impart motion to the cam to close the jaws, and a spring, $g'$, bolted to the frame-work and bearing at its free end against the jaw, to press the anti-friction roller constantly against the cam L, the tendency of which spring is to open the jaws, all substantially as shown and described.

12. In a wheel-riveting machine having an automatically-adjustable wheel-supporting spindle, automatically-operating spoke-grasping jaws and an automatically-reciprocating punch and presser-foot, all operating through the medium of cams (or eccentrics) and suitable power-transmitting gearing, the combination, with said operating parts and cams, of brackets adjustably connected to said operating parts and provided with anti-friction rollers to bear against the cams, whereby the relative movements of the parts may be changed and wear compensated for by adjusting the rollers to or from or relative to the cams, more or less, all substantially as shown and described.

13. In a wheel-riveting machine having movable or pivoted spoke-grasping jaws and dies, the combination, with the said dies, of a gaging-pin secured to one of said dies and extending out horizontally between the spoke-grasping jaws, as described, to the spoke of the wheel as it is pushed between the jaws, and act as a gage to center the said spoke with relation to the punch which operates upon it, substantially as set forth.

14. The combination, in a riveting-machine, with the main horizontal shaft E, having the cam T secured thereto near its forward end, of the presser-foot head C, open at its center, as shown, and provided with an anti-friction roller to bear against the cam T, the said head C having a presser-foot, T', secured to its lower end, and a spring, $k^8$, at its upper end, which spring is fixed at its opposite end to the frame of the machine, the tendency of the said spring being to keep the anti-friction roller which is fixed to the presser-foot head constantly in engagement with the presser-foot operating-cam T, substantially as and for the purpose described.

15. The combination, in a riveting-machine, with the head B, of the presser-foot head C, open at its center, as shown, and having the slot in one face thereof and a similar slot in the opposite face, and being provided with the presser-foot T', the horizontal foot of which is slotted, as shown, and which has the main body slotted, as at $o$, to permit the presser-foot to be adjustably secured to the presser-foot head by a bolt extending through said slot $o$ and head, the bracket $k^3$, provided with the anti-friction roller $k^5$, pivoted thereto, the said bracket or arms being adjustably secured to the presser-foot head, as set forth, the cam T and cam-shaft, to reciprocate the head C, and the flat spring $k^8$, hinged or movably connected at one end to the upper end of the head C and fixed at its opposite end to the framework, to keep the head elevated and its antifriction roller pressed against the operating-cam, substantially as described.

16. In a wheel-riveting machine, the combination of a wheel-supporting spindle, a pair of spoke-grasping jaws, and a punch, all operated by cams and cam-shafts communicating with each other through gears, the main shaft E, the spur-wheel E', loosely mounted thereon and provided with a clutch-half, $g^4$, as shown, the longitudinally-movable clutch-half $g^5$, mounted upon said shaft E, and adapted to engage with the clutch-half $g^4$, and shifting mechanism to throw the clutch-halves into and out of gear, all constructed and arranged substantially as and for the purpose described.

17. The combination, in a wheel-riveting machine, of a wheel-holding spindle, a pair of jaws to grasp the spoke of the wheel, a presser-foot to bear upon the tire to hold it in place, and a reciprocating punch to act upon the head of the spoke to rivet it to the tire, all automatically operated by cams and gearing, of a clutch and shifting mechanism consisting of the spur-wheel E', loosely mounted upon the shaft E, and having ratchet-teeth formed in the face of the hub to form a clutch-half, $g^4$, as shown, the clutch-half $g^5$, mounted upon the shaft and made longitudinally movable by sliding on spline $g^6$, said clutch-half $g^5$ having an annular groove, $g^7$, engaged by arms $g^8$ of a shifting-lever, the shifting-lever $g^9$, a bracket, $h^2$, to support the shifting-lever, spring $h^3$, encircling the shifting-rod and bearing against one arm of the bracket, an adjustable collar, $h^4$, against which the other end of the spring bears, the bell-crank $h^8$, connected to the shifting-rod $g^9$ at its upper end and pivoted at its center to the frame of the machine, the operating-rod $i^3$, attached to the rear end of the bell-crank, and the foot-lever pivoted at one end and connected to the operating-rod, all arranged and constructed substantially as shown and described.

18. In a wheel-riveting machine, the combination of spoke-grasping jaws and a movable cross-head carrying a wheel-support with mechanism for closing the jaws on the spoke and moving the cross-head away from the jaws, so as to cause a tension on the spoke.

19. In a wheel-riveting machine, the combination of spoke-grasping jaws, a movable cross-head carrying a wheel-support, and mechanism for causing said jaws to grasp the spoke and for moving the cross-head away from the jaws, so as to cause a tension on the spoke, with a punch for upsetting the end of the spoke and a presser-foot for holding the felly.

In testimony whereof I affix my signature in presence of two witnesses.

ARTHUR W. GRANT.

Witnesses:
 A. A. YEATMAN,
 CHASE STEWART.